Figure 1:
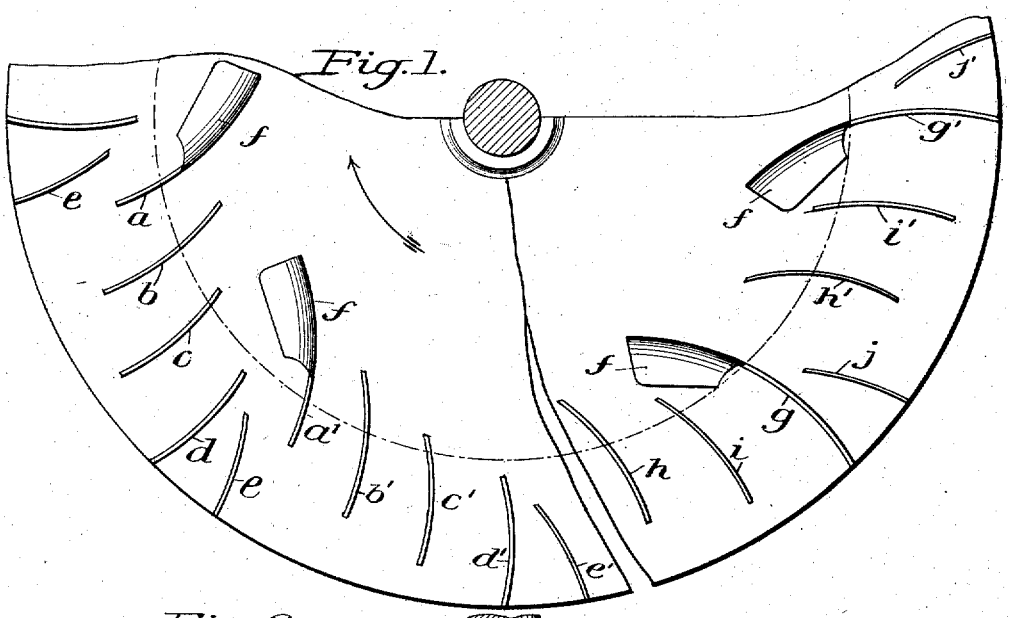

G. M. CAPELL.

CENTRIFUGAL FAN AND PUMP WHEEL.

APPLICATION FILED JULY 21, 1910.

Reissued Feb. 7, 1911. 13,200.

Witnesses
T. B. Humphries.
O. L. Thompson.

Inventor
George Marie Capell,
By J. N. Cooke,
Attorney.

THE NORRIS PETERS CO., PHOTO-LITHO., WASHINGTON, D. C.

UNITED STATES PATENT OFFICE.

GEORGE MARIE CAPELL, OF NEAR STONY STRATFORD, ENGLAND.

CENTRIFUGAL FAN AND PUMP-WHEEL.

13,200. Specification of Reissued Letters Patent. Reissued Feb. 7, 1911.

Original No. 867,874, dated October 8, 1907, Serial No. 325,695. Application for reissue filed July 21, 1910. Serial No. 573,144.

*To all whom it may concern:*

Be it known that I, GEORGE MARIE CAPELL, a subject of the King of Great Britain, residing at Passenham Rectory, near Stony Stratford, in the county of Buckingham, England, have invented new and useful Improvements in Centrifugal Fans and Pump-Wheels, of which the following is a specification.

This invention relates to improvements in the construction of centrifugal fans and pump wheels, the chief underlying principle of which consists in so constructing and arranging the vanes as to induce, to a maximum degree, a tendency to the production of cavitation or negative pressure, at the back of the portions of the vanes which are situated nearest to the center of revolution, thereby creating a tendency for the fluid to be urged from the inlet passage into the zone of direct action which is swept through by the vanes. Such means of promoting the flow of the fluid to and through the wheel, will operate in addition to a subsequently created urging force due to centrifugal action. By such means the output of the fan or pump wheel will be considerably increased and the flow through the wheel being largely assisted by an action which is independent of that due to the centrifugal whirl there will be a less expenditure of the head derived from the latter action in dragging the fluid through the supply passage and accordingly it will be delivered with an enhanced gage pressure.

To obtain a positive benefit from the action above described, it will be necessary to avoid the counter-vailing action which would be due to the creation of cavitation or negative pressure at the back of the outward lying portions of the vanes. The means which I adopt to promote cavitation behind the inner portions of the vanes and preclude its creation at the back of the outer portions, consists in arranging the vanes in a series of steps in which each vane of the series is situated at a greater radial distance from the center of rotation than the vane which next precedes it, this means being supplemented by the employment of a tail-blade or tail-blades situated at the back of the terminal vane of the series or at the back of that vane and other vanes of the series.

An example of a tail blade adapted to effect more or less efficiently the above described purpose will be found in the specification of my prior Patent No. 617,520 but I prefer a modification in the construction and arrangement of the tail-blade as shown on the accompanying drawings and as will presently be described.

An additional tendency to the creation of a negative pressure at the back of the inner portions of the vanes will be derived by adding, to one or more of the vanes of a series, a scoop-shaped extension which projects laterally into the air inlet passage. In general a plurality of series of stepped vanes will be requisite in which, succeeding the terminal vane of one series which is at the greatest distance from the center of rotation, there is a leading vane of the following series which is situated at the least distance from the center. For structural reasons, as apart from considerations relating to fluid action, it will often be advisable to employ some vanes which have a greater length than that which would be compatible with the foregoing description of vane construction. To harmonize this condition which is imposed by considerations relating to the provision of adequate strength, rigidity and durability in the most economical manner with those which efficient fluid action demand, I interpose between each two series of stepped and relatively short vanes, a lengthened vane which extends to the outer periphery of the wheels and supplants the terminal vane of the series of stepped vanes and which also, preferably but not necessarily, extends inward to the minimum advantageous distance of any vane from the center of rotation and virtually supplants also the leading vane of the succeeding series of stepped vanes.

Various alternatives of vane curvature and arrangement may be adopted, as for example:—The vanes which extend to the outer periphery of the wheel may be radial at the extremity, or they may be inclined forward a little, or they may be inclined backward, and the tail-blade may be straight or curved in any degree, subject to the condition that its conformation is approximately that of the portion of the vane which immediately precedes it, it being inclined relatively to a radius of the wheel in a backward direction only a small amount more than the vane itself. In respect to the inclination of the vanes and tail-blades the choice will depend on the relative importance of the requirements of large output, maximum efficiency and high or low gage pressure.

On the accompanying drawings I have shown four representative examples of construction.

Figure 2:
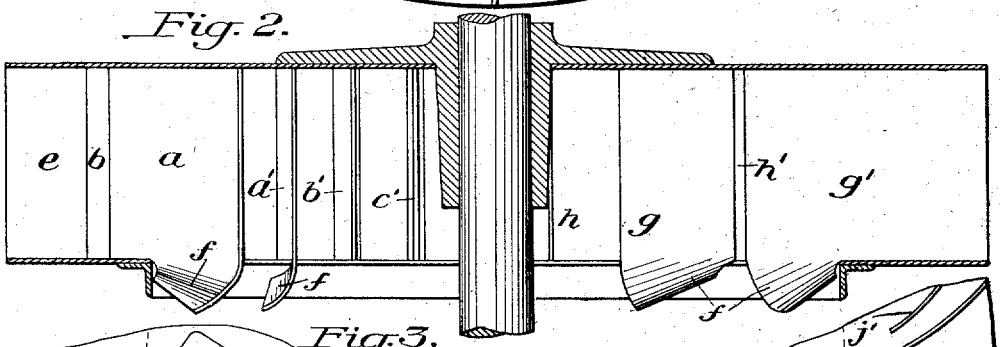
Figure 3:
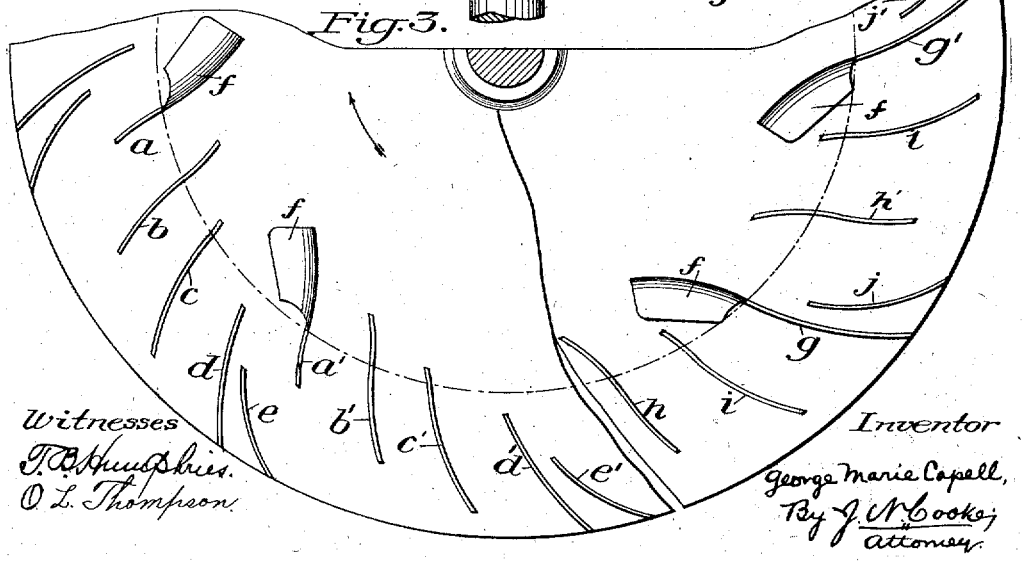

In these drawings:—Figure 1 is a half transverse section of a wheel in which, in the left-hand quadrant, is shown a form of construction in which stepped vanes only are employed and, in the right-hand quadrant, an alternative form of construction in which a lengthened vane is interposed between each two consecutive series of stepped vanes. Fig. 2 is a plan corresponding to Fig. 1. In these figures the furthest extending portions of the vanes are inclined somewhat in the forward direction. Fig. 3 shows a modified form of curvature of the vanes in which the farthest portions are inclined backward, those in the left-hand quadrant otherwise corresponding to the left-hand quadrant of Fig. 1 and in the right-hand quadrant interposed lengthened vanes are shown of different shape but otherwise as in the right-hand quadrant of Fig. 1.

In these figures *a b c* and *d* are four vanes forming a series of stepped vanes as described above, *a* being situated at the least radial distance from the center of revolution and *d* at the maximum distance, the outer edge of this latter being situated at the periphery of the wheel. The vanes of the succeeding series are denoted *a′ b′ c′* and *d′* respectively. On account of the remoteness of the inner portion of *a′* from the corresponding portion of *a* the negative pressure tended to be created at the back of the latter, by virtue of its onward motion, will be very pronounced, while at the back of the inner portion of *b* there also will be a similar tendency but less intense, because there is a portion of *a′* which follows more closely, and the same is true of the inner portion of *c*. To the back of the outer portion of *a* a portion of *b* will be relatively close and prevent any tendency to the creation of a negative pressure and the same thing is true, to the same degree, in respect to the outer portions of *d* and *c* but, inasmuch as *d′* is remote from the back of *d*, there would be a strong tendency to the creation of a negative pressure at the back of *d* were it not for the action of the tail-blade *e*. This blade is detached from *d*, is differently inclined and has a relatively small width of space between its inner edge and the back of the vane *d* through which space will pour a stream of fluid sufficient to aid in counteracting the tendency to cavitation at this portion of the wheel and leave the urging effect on the flow of the fluid due to cavitation in the inner portion of the vane zone undiminished by an opposing influence. Accordingly there will be a full bore discharge of fluid from between the vanes, and the flow through the wheel being largely due to the cavitation action, there will be little or no subtraction from the centrifugal head for this purpose. Thus a wheel, made as above described, will not only deliver a maximum volume of fluid but that fluid will be delivered with a maximum gage pressure also.

The vane *a* is provided with a laterally extending scoop portion *f* which will have the effect of augmenting the tendency to cause cavitation behind the inner portion of *a*.

On the right hand portions of Figs. 1 and 2 are shown vanes *g* and *g′* of extended length which are interposed between consecutive series of stepped vanes *h i* and *h′ i′*. In this case *g* and *g′* may be regarded each as supplanting two stepped vanes, namely the last of one series and the first of the next. This form of construction tends to impart increased strength, the principle of operation being as before. At the back of the outward lying portions of *g* and *g′* tail-blades *j* and *j′* are fitted like *e* and *e′* before mentioned.

In Fig. 3 the vanes are curved backward at their outward extremities, otherwise they are constructed and arranged like those previously described and they are correspondingly lettered. In this figure the tail-blades *e e′* and *j j′* are made to conform to the shape of *d* and *g*, that is to say, the concave surface of the tail-blade faces in the same direction as the concave surface of the portion of the vane which immediately precedes it, both facing in the forward direction, as in Fig. 1 or both facing backward as in Fig. 3. The tail-blade shaped to conform to the vane to which it is an appendage may be joined at its inner edge to the vane which precedes it, or close thereto, or it may have its inner edge separated from the back of the preceding vane by an interval wide enough to allow its action to be supplemented by a current of air passing through such interval from the inlet to the periphery of the wheel.

The drawing shows a form of wheel which has a single inlet orifice, but it will be obvious that the arrangement is equally applicable to a double inlet construction and in this latter the central diaphragm may extend to the outer periphery of the wheel or stop short thereof.

The drawing shows wheels adapted for operating on air. If water or other fluid is required to be circulated or pumped, the design will require some modifications of detail, but such detail forms no portion of the present invention.

Various other modifications and changes in the design and construction of my improved centrifugal fan and pump wheels may be resorted to without departing from the spirit of the invention or sacrificing any of its advantages, and the different improvements may of course, be employed separate from each other, such, for example, as the employment of the main vanes extending inwardly from the periphery together with the tail-blades located back of them, as described, without intermediate vanes, or the employment of the main vanes extending inwardly from the periphery together with the tail-blades located back of them, and one or more intermediate vanes extending from the periphery, or from some point between the periphery and the inlet circle, to or into the inlet circle, which intermediate vanes may or may not be provided with tail-blades located back of them as described.

For the action above described to be effective it will be requisite that the fluid which is discharged from the space between the tail-blade and the back of the preceding vane be delivered at an angle which does not differ much from that at which the fluid discharged from the front of the vane is delivered.

If with a vane curved forward at its outer periphery, to derive a high gage-pressure, there were associated a tail-blade which is curved backward as in my prior Patent No. 617,520, previously referred to, it would be necessary to close the passage between the vane and tail-blade as shown in that patent, otherwise the low-gage-pressure due to the forward surface of the backwardly curved tail-blade would be overpowered by the fluid discharged from the front of the vane, some of which would return to the center of the wheel through the passage provided between the vane and the inner edge of the tail-blade and thereby defeat the purpose of the present invention.

I claim:

1. A centrifugal wheel for circulating fluids, having a series of vanes extending inwardly from the periphery and blades back of the vanes, each such blade extending inwardly toward its vane and at a greater angle from the radius than such vane, the concave surfaces of the blades and the portion of the vanes immediately in front thereof facing both in the same direction.

2. A centrifugal wheel for circulating fluids, having a series of vanes extending inwardly from the periphery, and blades back of the vanes, each such blade extending inwardly toward its vane and at a greater angle from the radius than such vane to a point between the inlet and the periphery, the concave surfaces of the blades and the portion of the vanes immediately in front thereof facing both in the same direction.

3. A centrifugal wheel for circulating fluids, having a series of vanes extending inwardly from the periphery, and blades back of the vanes, each such blade extending inwardly toward its vane and at a greater angle from the radius than such vane, the concave surfaces of the blades and the portion of the vanes immediately in front thereof facing both in the same direction, said wheel having an opening at or near the inner end of said blade communicating with the space between the vane and blade.

4. A centrifugal wheel for circulating fluids, having a series of vanes extending inwardly from the periphery, and blades back of the vanes, each blade extending from the periphery inwardly toward its vane and at a greater angle from the radius than such vane to a point between the inlet and the periphery, the concave surfaces of the blades and the portion of the vanes immediately in front thereof facing both in the same direction, said wheel having an opening at the inner end of said blade communicating with the space formed between the vane and the blade.

5. A centrifugal wheel for circulating fluids, having a tail-blade fitted at the back of a vane, which blade extends toward its vane at a greater angle from the radius than such vane, the concave surfaces of the blade and the portion of the vane immediately in front thereof facing both in the same direction, a space interval being provided between the inner edge of the blade and the adjacent portion of the surface of the vane.

6. A centrifugal wheel for circulating fluids, comprising a series of vanes so radially stepped relatively to one another that the second and each of the following vanes of the series is situated at a greater radial distance from the center of rotation than the vane which next precedes it.

7. A centrifugal wheel for circulating fluids, comprising a series of vanes so radially stepped relatively to one another that the second and each of the following vanes of the series is situated at a greater radial distance from the center of rotation than the vane which next precedes it, and a tail-blade fitted at the back of the most outwardly extending portion of the terminal vane of the series.

8. A centrifugal wheel for circulating fluids, comprising a series of vanes so radially stepped relatively to one another that the second and each of the following vanes of the series is situated at a greater radial distance from the center of rotation than the vane which next precedes it, and a tail-blade fitted at the back of the most outwardly extending portion of the terminal vane of the series, which tail-blade is, at its outer edge, inclined backward relatively to the wheel periphery more than the immediately preceding vane and, at its inner edge is separated from the back of the preceding vane.

9. A centrifugal wheel for circulating fluids, comprising a plurality of series of vanes so radially stepped relatively to one another that the second and each of the following vanes of the series is situated at a greater radial distance from the center of rotation than the vane which next precedes it and, interposed between each series, a vane whose outer portion is substituted for the terminal vane of the preceding series and inner portion for the leading vane of the succeeding series.

10. A centrifugal wheel for circulating fluids, comprising a plurality of series of vanes so radially stepped relatively to one another that the second and each of the following vanes of the series is situated at a greater radial distance from the center of rotation than the vane which next precedes it, and, interposed between each series, a vane whose outer portion is substituted for the terminal vane of the preceding series and inner portion for the leading vane of the succeeding series, and a tail-blade fitted at the back of the outward portion of each of the most radially extending vanes.

11. A centrifugal wheel for circulating fluids, comprising a series of vanes so radially stepped relatively to one another that the second and each of the following vanes of the series is situated at a greater radial distance from the center of rotation than the vane which next precedes it, the portion of a vane which lies within the air inlet circle having a scoop-shaped addition which extends laterally from the wheel.

12. A centrifugal wheel for circulating fluids, comprising a plurality of series of vanes so radially stepped relatively to one another that the second and each of the following vanes of the series is situated at a greater radial distance from the center of rotation than the vane which next precedes it and, interposed between each series, a vane whose outer portion is substituted for the terminal vane of the preceding series and inner portion for the leading vane of the succeeding series, and a tail-blade fitted at the back of the outward portion of each of the most radially extending vanes, the inward portion of each of the innermost extending vanes having a scoop-shaped addition which extends laterally from the wheel.

13. A centrifugal wheel for circulating fluids, having a series of vanes extending inwardly from the periphery, and blades back of said vanes, each such blade extending inwardly toward its vane and at a greater angle from the radius than such vane and terminating short of the inner end of the vane, the concave surfaces of the blades and the portions of the vanes immediately in front thereof facing both in the same direction.

14. A centrifugal wheel for circulating fluids, having a series of vanes extending inwardly from the periphery, and blades back of the vanes, each such blade extending inwardly toward its vane and at a greater angle from the radius than such vane and terminating short of the inner end of the vane and leaving an opening between the inner end of the blade and the vane, the concave surfaces of the blades and the portions of the vanes immediately in front thereof facing both in the same direction.

15. A centrifugal wheel for circulating fluids, having a series of main vanes extending inwardly from the periphery, and one or more vanes located between said main vanes and extending from the inlet opening toward the periphery but terminating short thereof.

16. A centrifugal wheel for circulating fluids, comprising a series of main vanes extending inwardly from the periphery, tail-blades back of said vanes and diverging from the same as reckoned from the inner to the outer edge, and intermediate vanes between said main vanes extending toward the periphery and terminating short thereof.

17. A centrifugal wheel for circulating fluids, comprising a series of main vanes extending inwardly from the periphery, tail-blades back of said vanes and diverging from the same as reckoned from the inner to the outer edge, and intermediate vanes between said main vanes extending toward the periphery from the inlet circle and terminating short of the periphery 18. A centrifugal wheel for circulating fluids, comprising a series of main vanes extending inwardly from the periphery, tail-blades back of said main vanes and diverging from the same as reckoned from the inner to the outer edge, and intermediate vanes between said main vanes extending toward the periphery from within the inlet opening and terminating short of the periphery.

19. A centrifugal wheel for circulating fluids, comprising a series of main vanes extending inwardly from the periphery, tail-blades back of said vanes and diverging from the same as reckoned from the inner to the outer edge, and stepped intermediate vanes between said main vanes extending toward the periphery and terminating short thereof.

20. A centrifugal wheel for circulating fluids, comprising a series of main vanes extending inwardly from the periphery, tail-blades back of said vanes and diverging from the same as reckoned from the inner to the outer edge, and stepped intermediate vanes between said main vanes extending toward the periphery from the inlet circle and terminating short of the periphery.

21. A centrifugal wheel for circulating fluids, comprising a series of main vanes extending inwardly from the periphery, tail-blades back of said main vanes and diverging from the same as reckoned from the inner to the outer edge, and stepped intermediate vanes between said main vanes extending toward the periphery from within the inlet opening and terminating short of the periphery.

22. A centrifugal wheel for circulating fluids, comprising a series of main vanes extending inwardly from the periphery, and tail-blades back of said main vanes and diverging from the same as reckoned from the inner to the outer edge, each of said blades being of concave shape to its vane.

23. A centrifugal wheel for circulating fluids, comprising a series of main vanes extending inwardly from the periphery, tail-blades back of said main vanes and diverging from the same as reckoned from the inner to the outer edge, each of said blades being of concave shape to its vane, and intermediate vanes between said main vanes extending toward the periphery and terminating short thereof.

24. A centrifugal wheel for circulating fluids, comprising a series of main vanes extending inwardly from the periphery, tail-blades back of said main vanes and diverging from the same as reckoned from the inner to the outer edge, each of said blades being of concave shape to its vane, and intermediate vanes between said main vanes extending toward the periphery from the inlet circle and terminating short thereof.

25. A centrifugal wheel for circulating fluids, comprising a series of main vanes extending inwardly from the periphery, tail-blades back of said main vanes and diverging from the same as reckoned from the inner to the outer edge, each of said blades being of concave shape to its vane, and intermediate vanes between said main vanes extending toward the periphery from within the inlet opening and terminating short thereof.

26. A centrifugal wheel for circulating fluids, comprising a series of main vanes extending inwardly from the periphery, and stepped intermediate vanes between said main vanes extending toward the periphery and terminating short thereof.

27. A centrifugal wheel for circulating fluids, comprising a series of main vanes extending inwardly from the periphery, and stepped intermediate vanes between said main vanes extending toward the periphery from the inlet circle and terminating short of the periphery.

28. A centrifugal wheel for circulating fluids, comprising a series of main vanes extending inwardly from the periphery, and stepped intermediate vanes between said main vanes extending toward the periphery from within the inlet opening and terminating short of the periphery.

In testimony whereof I have signed my name to this specification in the presence of two subscribing witnesses.

GEORGE MARIE CAPELL.

Witnesses:

HERBERT D. JAMISON,

R. J. WILLIAMS.